United States Patent
Gunther et al.

(10) Patent No.: US 11,814,088 B2
(45) Date of Patent: Nov. 14, 2023

(54) VEHICLE HOST INTERFACE MODULE (VHIM) BASED BRAKING SOLUTIONS

(71) Applicant: Metrom Rail, LLC, Crystal Lake, IL (US)

(72) Inventors: Kurt Alan Gunther, Woodstock, IL (US); Peter Strezev, Apollo Beach, FL (US)

(73) Assignee: Metrom Rail, LLC, Crystal Lake, IL (US)

( * ) Notice: Subject to any disclaimer, the term of this patent is extended or adjusted under 35 U.S.C. 154(b) by 335 days.

(21) Appl. No.: 16/544,039

(22) Filed: Aug. 19, 2019

(65) Prior Publication Data

US 2019/0367064 A1    Dec. 5, 2019

Related U.S. Application Data (63) Continuation-in-part of application No. 15/927,612, filed on Mar. 21, 2018, now abandoned, which is a
(Continued)

(51) Int. Cl.
*B61L 15/00* (2006.01)
*B61L 25/02* (2006.01)
(Continued)

(52) U.S. Cl.
CPC ........ *B61L 15/0081* (2013.01); *B60T 8/1705* (2013.01); *B61L 3/125* (2013.01); *B61L 25/021* (2013.01); *B61L 25/025* (2013.01); *B61L 27/20* (2022.01); *B61L 27/40* (2022.01); *B60T 2270/406* (2013.01); *B61L 3/006* (2013.01)

(58) Field of Classification Search
CPC .......... B61L 3/006125; B61L 15/0081; B61L 25/021; B61L 25/025; B61L 27/0038; B61L 27/0077; B61L 27/04; B61L 2027/005; B61L 3/006; B61L 3/125; B60T 8/1705; B60T 17/228; B60T 2270/406; B61C 17/12
See application file for complete search history.

(56) References Cited

U.S. PATENT DOCUMENTS 2,188,293 A    1/1940  Williams
2,216,575 A   10/1940  Seinfeld et al.
(Continued)

FOREIGN PATENT DOCUMENTS

AU    2012227260    4/2014
AU    2015201462    10/2015
(Continued)

OTHER PUBLICATIONS

PCT, Notification of Transmittal of the International Search Report and the Written Opinion of the International Searching Authority, or the Declaration, in International application No. PCT/US2014/053900, dated Feb. 18, 2015 (21 pages).
(Continued)

*Primary Examiner* — Zachary L Kuhfuss
(74) *Attorney, Agent, or Firm* — McAndrews, Held & Malloy, Ltd.

(57) ABSTRACT

Systems and methods are provided for vehicle host interface module (vHIM) based braking solutions and use thereof in trains.

21 Claims, 3 Drawing Sheets

Related U.S. Application Data continuation of application No. 14/476,338, filed on Sep. 3, 2014, now abandoned.

(60) Provisional application No. 62/719,518, filed on Aug. 17, 2018, provisional application No. 61/959,729, filed on Sep. 3, 2013.

(51) Int. Cl.
| | |
|---|---|
| *B61L 3/12* | (2006.01) |
| *B60T 8/17* | (2006.01) |
| *B61L 27/40* | (2022.01) |
| *B61L 27/20* | (2022.01) |
| *B61L 3/00* | (2006.01) |

(56) References Cited

U.S. PATENT DOCUMENTS

| | | |
|---|---|---|
| 2,475,578 A | 7/1949 | Halstead |
| 2,762,913 A | 9/1956 | Jepson |
| 3,898,652 A | 8/1975 | Rashid |
| 4,208,717 A * | 6/1980 | Rush ............... B61L 3/225 246/187 B |
| 4,302,811 A | 11/1981 | McElhenny |
| 4,327,415 A | 4/1982 | Rush et al. |
| 4,459,668 A | 7/1984 | Inoue et al. |
| 4,495,578 A | 1/1985 | Sibley et al. |
| 4,538,228 A | 8/1985 | Brearey et al. |
| 4,869,557 A | 9/1989 | Gerum et al. |
| 5,036,478 A | 7/1991 | MacDougall |
| 5,198,800 A | 3/1993 | Tozawa et al. |
| 5,283,589 A | 2/1994 | Blevins |
| 5,420,883 A | 5/1995 | Swensen et al. |
| 5,452,870 A | 9/1995 | Heggestad |
| 5,554,982 A | 9/1996 | Shirkey et al. |
| 5,620,155 A | 4/1997 | Michalek |
| 5,652,570 A | 7/1997 | Lepkofker |
| 5,675,190 A | 10/1997 | Morita |
| 5,727,758 A | 3/1998 | Penza et al. |
| 5,907,294 A | 5/1999 | Welte et al. |
| 5,924,651 A | 7/1999 | Penza et al. |
| 5,939,986 A | 8/1999 | Schiffbauer et al. |
| 5,950,966 A | 9/1999 | Hungate et al. |
| 5,995,881 A | 11/1999 | Kull |
| 6,113,037 A | 9/2000 | Pace |
| 6,133,876 A | 10/2000 | Fullerton et al. |
| 6,135,396 A | 10/2000 | Whitfield et al. |
| 6,145,792 A | 11/2000 | Penza et al. |
| 6,208,260 B1 | 3/2001 | West et al. |
| 6,332,887 B1 | 5/2001 | Carson |
| 6,435,459 B1 | 8/2002 | Sanderson et al. |
| 6,597,293 B1 | 7/2003 | Harrison |
| 6,631,322 B1 | 10/2003 | Arthur et al. |
| 6,666,411 B1 | 12/2003 | Hart et al. |
| 6,732,023 B2 | 5/2004 | Sugita et al. |
| 6,759,948 B2 | 7/2004 | Grisham et al. |
| 7,075,427 B1 | 7/2006 | Pace et al. |
| 7,148,791 B2 | 12/2006 | Grisham et al. |
| 7,167,082 B2 | 1/2007 | Stigall |
| 7,624,952 B1 | 12/2009 | Bartek |
| 7,725,252 B2 | 5/2010 | Heddebaut et al. |
| 8,109,474 B2 | 2/2012 | Bartek |
| 8,126,035 B2 | 2/2012 | Hashimoto et al. |
| 8,200,380 B2 | 6/2012 | Ghaly |
| 8,245,983 B2 | 8/2012 | Gilbertson |
| 8,248,263 B2 | 8/2012 | Shervey et al. |
| 8,344,877 B2 | 1/2013 | Sheardown et al. |
| 8,423,240 B2 | 4/2013 | Mian |
| 8,478,463 B2 | 7/2013 | Knott et al. |
| 8,650,242 B2 | 2/2014 | Yuki et al. |
| 8,651,433 B2 | 2/2014 | Ghaly |
| 8,786,428 B2 | 7/2014 | Sheardown et al. |
| 8,874,359 B2 | 10/2014 | Douglas et al. |
| 8,952,805 B2 | 2/2015 | Baines et al. |
| 8,998,149 B2 | 4/2015 | Takahashi et al. |
| 9,002,546 B2 | 4/2015 | Whitwam et al. |
| 9,008,854 B2 | 4/2015 | Breed |
| 9,022,325 B2 | 5/2015 | Tsukamoto |
| 9,128,815 B2 | 9/2015 | Kanner et al. |
| 9,134,411 B2 | 9/2015 | Soderi et al. |
| 9,434,397 B2 | 9/2016 | Chung et al. |
| 9,606,217 B2 | 3/2017 | Bruemmer et al. |
| 2003/0028323 A1 | 2/2003 | Zeitler et al. |
| 2003/0214417 A1 | 11/2003 | Peltz et al. |
| 2004/0155760 A1 | 8/2004 | Grisham |
| 2004/0155822 A1 | 8/2004 | Lien |
| 2004/0240565 A1 | 12/2004 | Santhoff et al. |
| 2005/0010338 A1 | 1/2005 | Kraeling et al. |
| 2005/0110628 A1 | 5/2005 | Kernwein et al. |
| 2005/0143037 A1 | 6/2005 | Stratis et al. |
| 2006/0009240 A1 | 1/2006 | Katz |
| 2006/0015224 A1 | 1/2006 | Hilleary |
| 2006/0151672 A1 | 7/2006 | Heddebaut |
| 2006/0199146 A1 | 9/2006 | Mandelkern et al. |
| 2007/0241888 A1 | 10/2007 | MantoVani et al. |
| 2007/0255498 A1 | 11/2007 | McDaniel et al. |
| 2007/0281745 A1 | 12/2007 | Parkulo et al. |
| 2007/0293153 A1 | 12/2007 | Molisch et al. |
| 2008/0040023 A1 | 2/2008 | Breed et al. |
| 2008/0114519 A1 | 5/2008 | Defaux |
| 2008/0150786 A1 | 6/2008 | Breed |
| 2008/0170533 A1 | 7/2008 | Cyzs et al. |
| 2009/0212168 A1 | 8/2009 | Kumar |
| 2009/0243397 A1 | 10/2009 | Cook et al. |
| 2009/0253439 A1 | 10/2009 | Gantner et al. |
| 2009/0255329 A1 | 10/2009 | Connell et al. |
| 2009/0326746 A1 | 12/2009 | Mian |
| 2010/0039978 A1 | 2/2010 | Rangan |
| 2010/0052945 A1 | 3/2010 | Breed |
| 2010/0063656 A1 | 3/2010 | Knott et al. |
| 2010/0102954 A1 | 4/2010 | Radivojevic et al. |
| 2010/0124898 A1 | 5/2010 | Qu et al. |
| 2010/0225527 A1 | 9/2010 | Talty |
| 2010/0235460 A1 | 9/2010 | Mochizuki et al. |
| 2010/0256843 A1 * | 10/2010 | Bergstein ............ B61L 15/0063 701/19 |
| 2010/0268466 A1 | 10/2010 | Amutham |
| 2010/0327125 A1 | 12/2010 | Braband et al. |
| 2011/0006912 A1 | 1/2011 | Sheardown et al. |
| 2011/0046845 A1 | 2/2011 | Kozlay |
| 2011/0075641 A1 | 3/2011 | Siriwongpairat et al. |
| 2011/0084854 A1 | 4/2011 | Johnson |
| 2011/0152971 A1 | 6/2011 | Nghiem et al. |
| 2011/0172856 A1 | 7/2011 | Kull |
| 2011/0184621 A1 | 7/2011 | Bock et al. |
| 2011/0234199 A1 * | 9/2011 | Baert ................. H01H 47/002 324/72 |
| 2011/0234451 A1 | 9/2011 | Bock et al. |
| 2012/0029740 A1 | 2/2012 | Bock et al. |
| 2012/0077537 A1 | 3/2012 | Muratov et al. |
| 2012/0123617 A1 | 5/2012 | Noffsinger et al. |
| 2012/0126065 A1 | 5/2012 | Smith et al. |
| 2012/0182191 A1 | 7/2012 | King |
| 2012/0286563 A1 | 11/2012 | Lichterfeld et al. |
| 2012/0296562 A1 | 11/2012 | Carlson et al. |
| 2012/0296567 A1 | 11/2012 | Breed |
| 2012/0326891 A1 | 12/2012 | Cross |
| 2013/0021215 A1 | 1/2013 | Suzuki et al. |
| 2013/0024054 A1 | 1/2013 | Katsuta et al. |
| 2013/0046420 A1 | 2/2013 | Gottifredi et al. |
| 2013/0138276 A1 | 5/2013 | Soderi et al. |
| 2013/0166114 A1 | 6/2013 | Baines et al. |
| 2013/0214990 A1 | 8/2013 | Chiu |
| 2013/0237273 A1 | 9/2013 | Klein et al. |
| 2013/0256466 A1 | 10/2013 | Carlson et al. |
| 2014/0045547 A1 | 2/2014 | Singamsetty et al. |
| 2014/0046514 A1 | 2/2014 | Jennek et al. |
| 2014/0173155 A1 | 6/2014 | Slattery |
| 2014/0191089 A1 | 7/2014 | Reichlin et al. |
| 2014/0214247 A1 | 7/2014 | Myokei |
| 2014/0214248 A1 | 7/2014 | Yamada |
| 2014/0229096 A1 | 8/2014 | Carlson |
| 2014/0263856 A1 | 9/2014 | Hann |
| 2015/0032302 A1 | 1/2015 | Foerster et al. |

(56) References Cited

U.S. PATENT DOCUMENTS

| | | |
|---|---|---|
| 2015/0060608 A1 | 3/2015 | Carlson et al. |
| 2015/0097412 A1 | 4/2015 | Smith |
| 2015/0329130 A1 | 11/2015 | Carlson et al. |
| 2015/0344048 A1 | 12/2015 | Kernwein |
| 2015/0367822 A1 | 12/2015 | Jennek et al. |
| 2016/0046308 A1 | 2/2016 | Chung et al. |
| 2016/0176422 A1 | 6/2016 | Cross |
| 2016/0200327 A1 | 7/2016 | Liu |
| 2016/0221592 A1 | 8/2016 | Puttagunta et al. |
| 2016/0280240 A1 | 9/2016 | Carlson et al. |
| 2016/0339934 A1 | 11/2016 | Chung et al. |
| 2017/0101116 A1 | 4/2017 | Shubs, Jr. et al. |
| 2017/0113707 A1 | 4/2017 | Ghaly |
| 2017/0245192 A1 | 8/2017 | Sadri et al. |
| 2017/0282944 A1 | 10/2017 | Carlson et al. |
| 2018/0362058 A1 | 12/2018 | Carlson et al. |
| 2019/0054942 A1 | 2/2019 | Carlson |
| 2019/0071106 A1 | 3/2019 | Carlson |
| 2019/0263432 A1 | 8/2019 | Carlson et al. |
| 2019/0283721 A1 | 9/2019 | Carlson et al. |

FOREIGN PATENT DOCUMENTS

| | | |
|---|---|---|
| CA | 22220819 | 1/2000 |
| CN | 1417071 | 5/2003 |
| CN | 1676375 | 10/2005 |
| CN | 201323574 | 10/2009 |
| CN | 102923158 | 2/2013 |
| DE | 102008020700 | 11/2009 |
| EP | 1785744 | 5/2007 |
| EP | 2571742 | 11/2009 |
| JP | 2001106074 | 4/2001 |
| JP | 4755521 | 8/2011 |
| JP | 4917313 | 4/2012 |
| KR | 20050097843 | 10/2005 |
| KR | 100733599 | 7/2007 |
| KR | 100975289 | 8/2010 |
| KR | 20140017157 | 2/2014 |
| WO | 03009254 | 1/2003 |
| WO | 03012470 | 2/2003 |
| WO | 2013056244 | 4/2013 |

OTHER PUBLICATIONS

Chinese Offfice Action for Application No. 201710074449.6, dated Jan. 17, 2019 (22 pages).
International Search Report and Written Opinion for PCT/US2018/045388, dated Oct. 18, 2018. (16 pages).
International Search Report and Written Opinion for PCT/US2016/023754, dated Aug. 8, 2016. (10 pages).
International Search and Written Opinion for PCT/US2018/049062, dated Nov. 9, 2018. (13 pages).
International Search and Written Opinion for PCT/US19/20385, dated Jun. 28, 2019. (15 pages).
Chinese Office Action in Appln. No. 201710074449.6, dated Nov. 25, 2019. (9 pages including English Biblio/ Abstract page).
Certified English-Language Translation of German Patent Application Pub. No. DE102008020700A1 ("Meyer"), 13 pages.
IEEE Standard for Local and Metropolitan Area Networks: Part 15.4: Low-Rate Wireless Personal Area Networks (LR-WPANs), IEEE Std 802.15.4™-2011, Sep. 5, 2011, 314 pages.
Newton's Telecom Dictionary (27th ed 2013), 3 pages.
Time Domain's Ultra Wideband (UWB) Definition and Advantages, Time Domain (Mar. 2011), 14 pages.
Int. J. ITS Res. (2016), "Assessment of the Contribution of Time Reversal of a UWB Localization System for Railway Application", 13 pages.
C. L. Bennett and G. F. Ross, "Time-domain electromagnetics and its applications," in Proceedings of the IEEE, vol. 66, No. 3, pp. 299-318, Mar. 1978, 23 pages.
An Outdoor UWB Tracking System to Improve Safety of Semi-Autonomous Vehicle Operations ("Richardson"), 13 pages.
"Driving Assistance Provided by Adaptive Cruise Control", P. Fancher, et al., University of Michigan Transportation Research Institute. 13 pages.
SAE J2735/2009-11, 359 pages.
"Operation of the Eaton VORAD Collision Warning System and Analysis of the Recorded Data", David A. Danaher, et al., Veritech Consulting Engineering, LLC., 10 pages.
"Transponder History—RADAR Identification of Aircraft", Experimental Aircraft Info, Jul. 20, 2022, 5 pages.
"Collision of Metrolink Train 111 With Union Pacific Train LOF65-12", National Transportation Safety Board Accident Report, Sep. 12, 2008, 83 pages.
"Collisions & Casualties by Year", Federal Railroad Administration, 3 pages.
"Fatal Crashes at Highway Rail Grade Crossings", International Journal of Transportation Science and Technology, vol. 11, Issue 1, Mar. 2022, 23 pages.
"Highway-Rail Grade Crossings Overview", U.S. Department of Transportation, Federal Railroad Administration, Last updated: Wednesday, Dec. 4, 2019, 2 pages.
"Railroad Accident: Common Causes, Statistics and Prevention", 10 pages.
Positive Train Control, May 2012, 25 pages.
"CCS: A Railway Corridor Control System Utilizing UWB Radio Technology", Paul A. Flaherty, 2004 ASME/IEEE Joint Rail Conference, Apr. 6-8, 2004, 4 pages.
ETSI Technical Report 101 538 V1.1.1 (Oct. 2012), 34 pages.

\* cited by examiner

VEHICLE HOST INTERFACE MODULE (VHIM) BASED BRAKING SOLUTIONS

CLAIM OF PRIORITY

This patent application makes reference to, claims priority to, and claims benefit from U.S. Provisional Patent Application Ser. No. 62/719,518, filed on Aug. 17, 2018. This patent application is also continuation-in-part of U.S. patent application Ser. No. 15/927,612, filed on Mar. 21, 2018, which is a continuation of U.S. patent application Ser. No. 14/476,338, filed on Sep. 3, 2014, which claims priority from U.S. Provisional Patent Application No. 61/959,729, filed on Sep. 3, 2013. Each of the above identified application is hereby incorporated herein by reference in its entirety.

TECHNICAL FIELD

Aspects of the present disclosure relate to control solutions for railway systems. More specifically, various implementations of the present disclosure relate to vehicle host interface module (vHIM) based braking solutions and use thereof in conjunction with railway systems.

BACKGROUND

Various issues and challenges may exist with conventional braking solutions used in trains. In this regard, conventional systems and methods, if any existed, for controlling braking functions and components in trains may be costly, inefficient, and cumbersome.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

System and methods are provided for vehicle host interface module (vHIM) based braking solutions, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

As utilized herein the terms "circuits" and "circuitry" refer to physical electronic components (e.g., hardware), and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

Implementations in accordance with the present disclosure are directed relate to enhanced braking control solutions for use in trains, in conjunction with central train control systems, particularly by utilizing vehicle host interface module (vHIM) based braking solutions.

Figure 1:
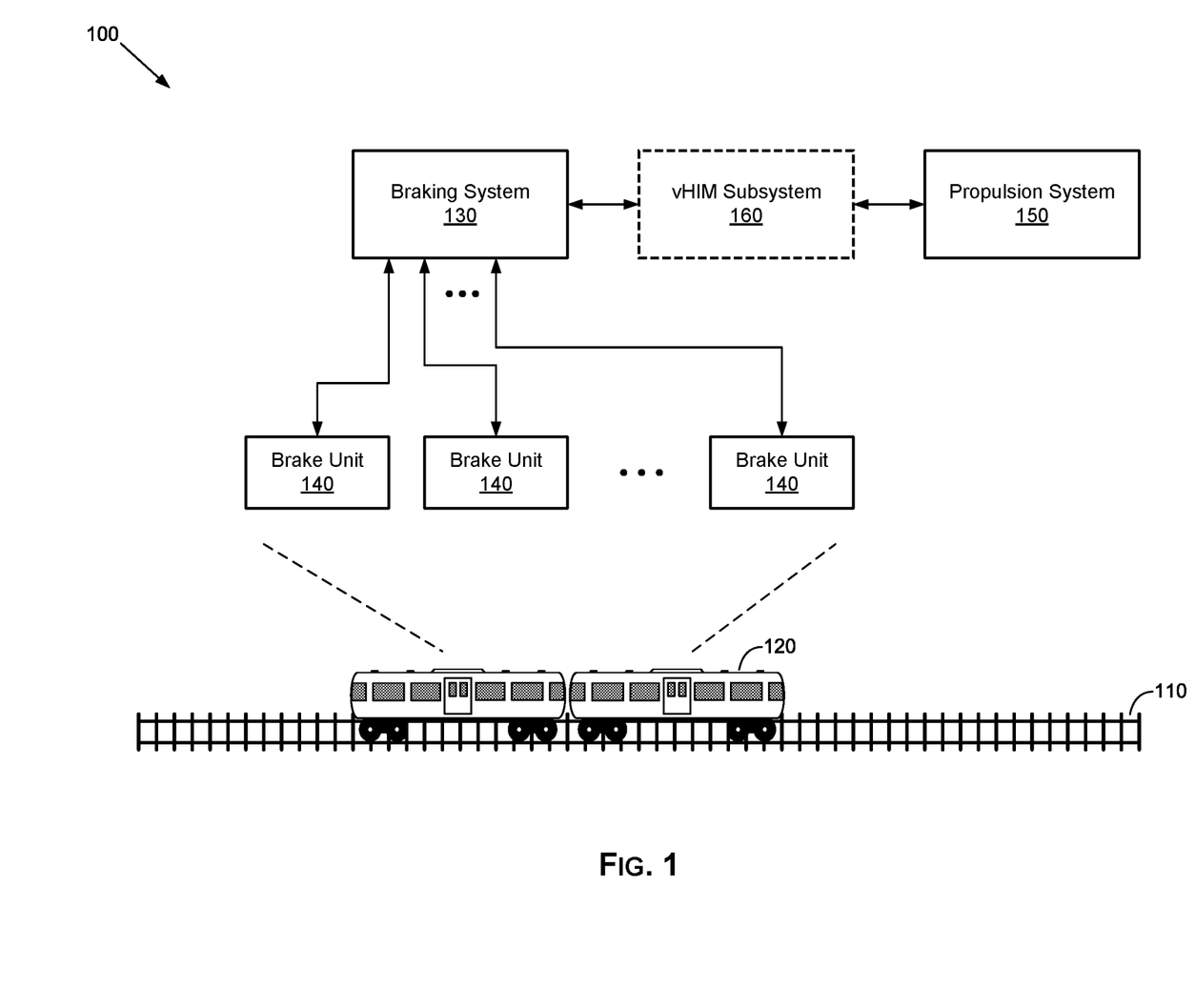
FIG. 1 illustrates an example train control system that may incorporate vehicle host interface module (vHIM) based braking solutions, in accordance with the present disclosure.

FIG. 1 illustrates an example train control system that may incorporate vehicle host interface module (vHIM) based braking solutions, in accordance with the present disclosure. Shown in FIG. 1 is a train 120 that is configured for supporting, and incorporates vehicle host interface module (vHIM) based braking solutions.

The train 120 may be configured to support reducing stopping distances in an adaptive and enhanced manner, particularly by incorporating vehicle host interface module (vHIM) based braking solutions. In this regard, in conventional solutions, trains (such as the train 120) may incorporate braking systems (e.g., braking system 130 in the train 120) for enabling stoppage (or slowing down) of the trains while running (e.g., in track 110 for the train 120, as shown in FIG. 1). The braking system 130 may comprise suitably circuitry for determining when the train needs to be stopped (or slowed down), and for controlling operations that effectuate the desired stoppage or slowing down. In this regard, the braking system 130 may interact with, and/or control one or more brake units 140. The brake units 140 may comprise, for example, suitable physical components (and if necessary related hardware, including circuitry) that cause the train to stop or slow down, such as by engaging the wheels of the train, to stop their movement. The train 120 may have multiple brake units 140, each assigned to one of the cars (or wheel axis thereof) in the train.

The braking system 130 may also interact with, and/or control components that provide the driving force in the trains. For example, the braking system 130 may interact with a propulsion system 150 in the train 120. In this regard, the propulsion system 150 may provide the driving force (e.g., electrical, mechanical, etc.) to the wheels in the train to cause its movement. Thus, the braking system 130 may interact with the propulsion system 150, to cause the train 120 to stop or slow down, such as by causing the propulsion system 150 to cease driving the wheels of the train.

To enhance train operations, it may be desirable to incorporate into the trains solutions for allowing automated and/or remote control of braking operations, such as by allowing activating or deactivating, and adaptively controlling, braking functions, when deemed necessary for example. Solutions in accordance with the present disclosure address such issues, particularly by use of vehicle host interface module (vHIM) based braking components.

For example, a vehicle host interface module (vHIM) subsystem 160 may be incorporated into the train 120. In this regard, vehicle host interface module (vHIM) based systems may be configured for allowing central train control systems to interact with and control trains (e.g., mass transit railcars), allowing for direct interface between the central controller on one side, and the brake and propulsion systems in the trains on the other side. This may allow the train control systems/operators to activate (or de-active), and/or otherwise control the braking relating functions of the train. Example central train control systems may include communications-based train control (CBTC) based systems, positive train control system (PTCS) based systems, etc.

Figure 2A:
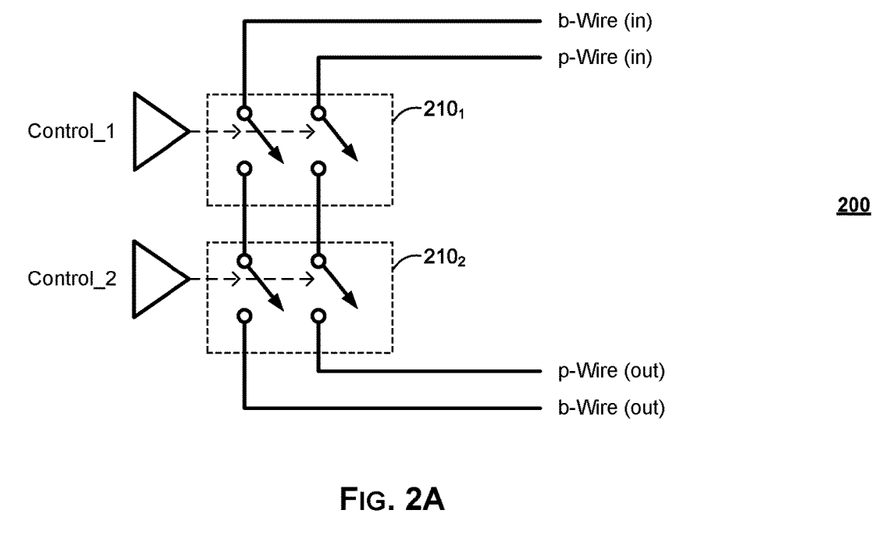
FIG. 2A illustrates an example vehicle host interface module (vHIM) interface circuit, in accordance with the present disclosure.

FIG. 2A illustrates an example vehicle host interface module (vHIM) interface circuit, in accordance with the present disclosure. Shown in FIG. 2A is vehicle host interface module (vHIM) interface circuit 200.

The vHIM interface circuit 200 may comprise suitable circuitry for interfacing with and controlling propulsion and braking systems. For example, in some railcars two current loops may be used to determine the behavior of the propulsion and braking systems (referred to as "P-wire" and "B-wire", respectively). Example P-wire and B-wire current loops may be configured to operate in particular manner— e.g., using 109 Hz square wave signals, with proportional control of the respective system performed by varying the current in the loop between 0 mA and 100 mA. The combination of these two signals determines the behavior of the train's propulsion and braking systems. The vHIM interface circuit 200 may be configured to utilize these signals to, for example, facilitate full service brake, which includes concurrently controlling the controlling propulsion and braking systems. For example, when the P-wire and B-wire current loops are opened at the same time, which results in 0 mA current flow in each of the P-wire and B-wire current loops, resulting in the train executing the full service brake.

In the example implementation shown in FIG. 2A, the interface between the vHIM system and the braking circuit is accomplished through two electromagnetic relays 210$_1$ and 210$_2$. The relays 210$_1$ and 210$_2$ may provide galvanic isolation—e.g., between a central control system and the train's brake and propulsion control system. The vHIM braking control interface provides separate relay contact sets, the P-wire and B-wire current loops in each of the relays 210$_1$ and 210$_2$. Both the P-wire and B-wire contacts are connected such that both signal loops may be interrupted simultaneously, to initiate a full service brake. The vHIM system may be configured such that it may not exert independent control over either the P-wire or the B-wire current loops.

In some implementations, the vHIM system may be configured for utilizing redundancy to enhance operation. For example, two independent systems may be used to control two independent relays 210$_1$ and 210$_2$, for redundancy purposes, indicated as "Control_1" and "Control_2" as shown in FIG. 2A. The relay contacts may be connected in series, such that if either of the relays 210$_1$ and 210$_2$ is de-energized, the contacts will open, resulting in a 0 mA current flow and a full service brakes will be applied.

In some implementations, "normally open" relay contacts may be used so that in the event of a fault condition, such as a loss of power to the vHIM subsystem, the train's P-wire and B-wire current loops will be interrupted, causing the full service brake activation.

In some implementations, the vHIM system may be configured to assert one of two states in the braking circuit interface: 1) "pass-thru", where the vHIM subsystem exerts no influence on the train's propulsion and braking system, such as during normal train operation, and 2) full service brake.

Figure 2B:
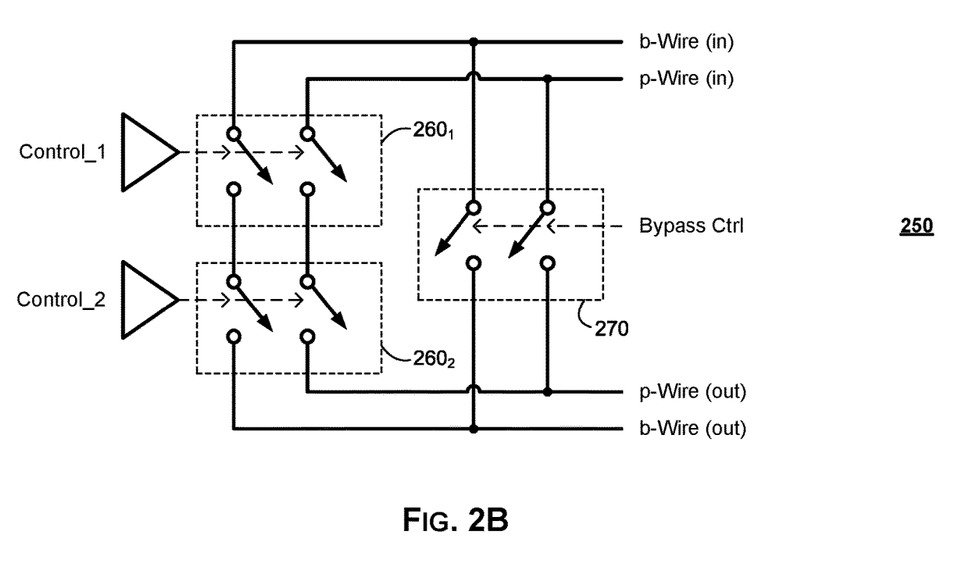
FIG. 2B illustrates an example vehicle host interface module (vHIM) interface circuit with bypass, in accordance with the present disclosure.

FIG. 2B illustrates an example vehicle host interface module (vHIM) interface circuit with bypass, in accordance with the present disclosure. Shown in FIG. 2B is vehicle host interface module (vHIM) interface circuit 250.

The vHIM interface circuit 250 is substantially similar to the vHIM interface circuit 200 and may operate in substantially the same manner as described with respect to FIG. 2B. In this regard, the vHIM interface circuit 250 may similarly incorporate electromagnetic relays 260$_1$ and 260$_2$, which are similar to the relays 210$_1$ and 210$_2$, and as such are similarly configured to provide galvanic isolation between a central control system and the train's brake and propulsion control system galvanic isolation—e.g., between a central control system and the train's brake and propulsion control system. The vHIM interface circuit 250 may incorporate bypass support, however.

In this regard, the vHIM interface circuit 250 may comprise (additional) suitable circuitry to enable bypassing brake control functions. For example, the vHIM interface circuit 250 may comprise bypass switch(s) 270 configured to allow train operators, when necessary, to override brake commands issued and/or applied remotely by central control systems. As shown in the example implementation illustrated in FIG. 2B, the bypass switch(s) 270 may be mounted externally to the vHIM system, and may be connected in parallel with the vHIM relays, as described above with respect to FIG. 2A. Thus, when the bypass switch(s) 270 are activated, they provide parallel current path(s) around the vHIM braking relay contacts, preventing interruption of the P-wire and B-wire current loops (e.g., by brake control commands, issued or triggered by remote central control systems).

In some example implementations, the vHIM system or components (e.g., vHIM brake interface) may be configured to comply with particular safety requirements and/or apply particular safety concepts—e.g., IEEE-1483 and American Railway Engineering and Maintenance-of-Way Association (AREMA) safety concepts. For example, vHIM brake interface may be configured to apply or support one or more of Class I intrinsic fail-safe design, and Class II safety concepts, as set forth in AREMA Communications & Signals Manual of Recommended Practice section 17.3.3 (AREMA C&S 17.3.3). Thus, the vHIM brake interface may be configured to support use of such features as checked redundancy, diversity and self-checking, etc. An example architecture of vHIM based interface and the safety concepts applied thereby are described below.

Figure 3:
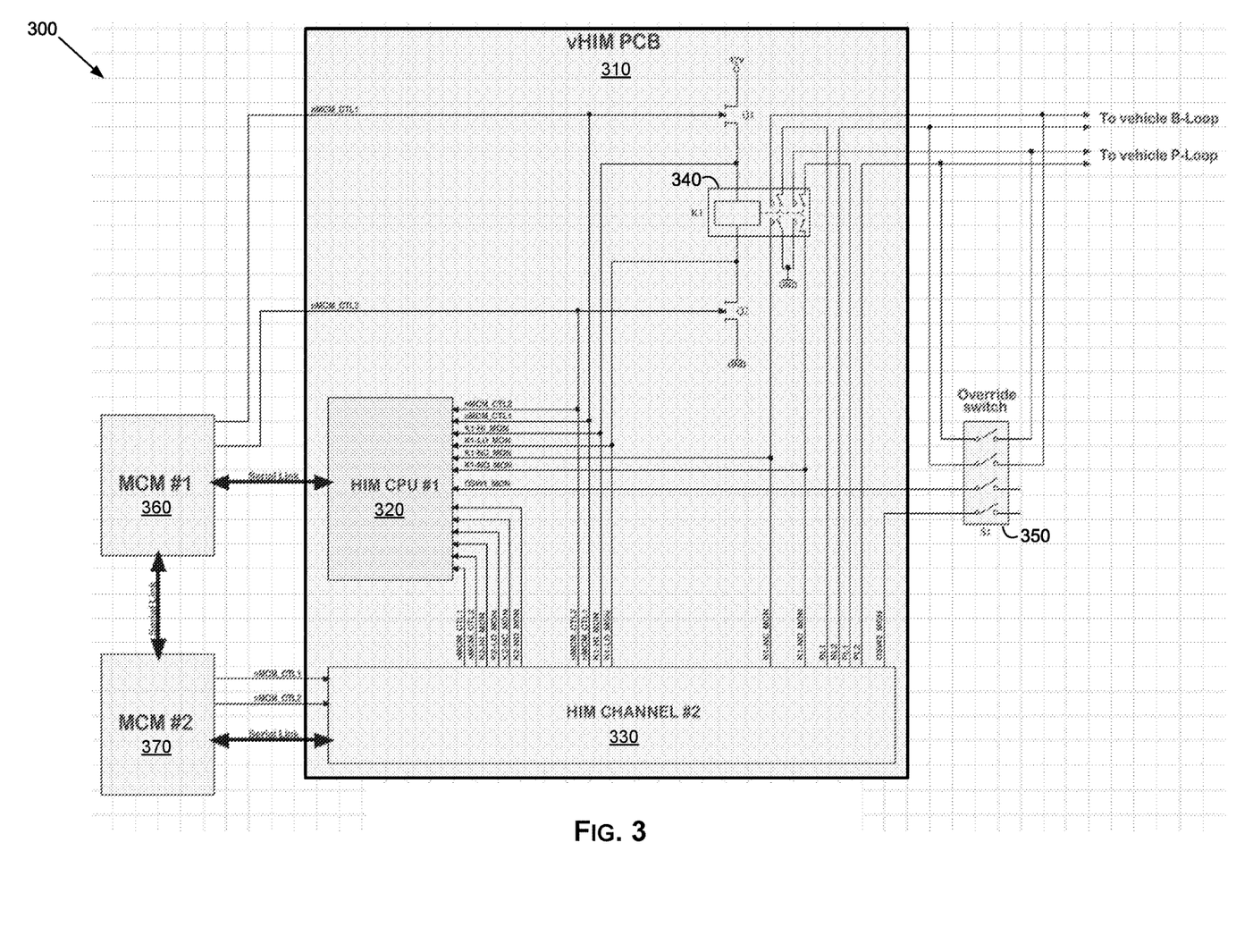
FIG. 3 illustrates an example vehicle host interface module (vHIM) controller architecture, in accordance with the present disclosure.

FIG. 3 illustrates an example vehicle host interface module (vHIM) controller architecture, in accordance with the present disclosure. Shown in FIG. 3 is vehicle host interface module (vHIM) based architecture 300.

The vHIM based architecture 300 may be configured for implementing and/or supporting vehicle host interface module (vHIM) based solutions. In this regard, the vHIM based architecture 300 may comprise suitable circuitry for interfacing with and controlling propulsion and braking systems (e.g., in trains).

For example, as shown in the example implementation illustrated in FIG. 3, the vHIM based architecture 300 may comprise a main vHIM board (e.g., printed circuit board (PCB)) 310. For example, the vHIM board 310 may comprise one or more host interface module (HIM) central processing units (CPUs) 320, one or more host interface module (HIM) channels (hereinafter "HIM channels") 330, and one or more relays Ki, of which relay K1 340 is shown. The vHIM based architecture 300 may further comprise pair of identical, redundant "Main Control Module" (MCM) processors (also simply referred to hereinafter as "MCMs") 360 and 370, for controlling the brake interface. Additionally, the vHIM based architecture 300 may optionally comprise an override switch (S1) 350.

The MCM processors 360 and 370 are arranged in a "checked redundancy" configuration. Each of the MCM processors 360 and 370 may execute identical control software, with each MCM processor comparing each vital parameter and function with the results from the other MCM processor (thus achieving the desired "checked redundancy"). Each of the MCM processors 360 and 370 controls its own independent service brake interface relay, such as via two logic-level output signals that travel over a backplane to the vHIM (e.g., the vHIM board 310), which may be positioned between the MCM processors in the card rack.

For example, as shown in FIG. 3, these drive signals are designated "pMCMCTL1" and "pMCMCTL2". A logic "true" state on both of these signals is necessary for the P-wire and B-wire current loops to be closed by the vHIM relay. In this regard, the "true" state may correspond to "high" voltage—that is, voltage value defined as representing a "high" state, which in turn is construed as logic "true." The disclosure is not so limited, however. For example, with respect to the implementation shown in FIG. 3, semiconductor switch Q1 and Q2 (illustrated as N-channel JFETs in the example implementation shown in FIG. 3) are used in controlling the relay K1 340. In this regard, it should be noted that schematic illustrated in FIG. 3 is merely a functional representation, and as such not all circuits that may be used in facilitate use of the Q1/Q2 in controlling the relay K1 340 are shown. Setting the pMCM_CTL1 to "true" turns on (e.g., enable) semiconductor switch Q1, whereas setting pMCM_CTL1 to "false" turns off (e.g., disables) semiconductor switch Q1. Thus, when the current loops are closed, normal train operation is enabled. Nonetheless, it should be understand that this is only an example implementation and that other approaches may be used—that is, that this is only an illustration of the schematic shown, and that other techniques may be applied differently to accomplish the logical "AND" function, where both signals must be in a "true" state in order to close the vHIM relay contacts.

In an example control signal routing scheme/arrangement, the xMCM_CTLy signals from the MCM processors (thus, four xMCM_CTLy signals for the pair of MCM processors) may be routed to backplane connector pins, which may be separated from all other pins using "skipped pin" isolation. In other words, given an example with linearly incrementing pin numbers, if pMCM_CTL1 is on pin #1, the next relay control pin will be on pin #3. Pin #2 is left open (with no PCB pad). The separation between the conductive pins on the circuit board provides sufficient galvanic isolation (e.g., creepage distance) to comply with class 1 intrinsic safety.

For example, the circuit traces for the four relay control signals on the MCM processor, the backplane, and the vHIM board may be separated from each other and all other circuitry by at least 0.10 inches. Further, for added separation, each circuit may be humisealed (e.g., with Parylene). The separation (e.g., creepage distance) and conformal coating or sealing achieve compliance with AREMA C&S 17.3.3, ensuring there is no plausible/credible short-circuit failure mode between the signals. The HIMCTL signals within the vHIM board 310 may be named differently, to identify the driving source. For example, as shown in FIG. 3, the names of the relay control signals on/within the vHIM board are "pMCM_CTLx" and "sMCM_CTLx", where x=1 or 2, "p" designates the "primary" MCM, and the "s" designates the "secondary" MCM. In this regard, the "primary/secondary" designation has no bearing on normal train operation, as both MCMs are physically and operationally identical during train operation. Rather, the "primary/secondary" differentiation refers to the function of the MCMs during non-operational activities, such as maintenance. In this regard, the "primary" MCM during maintenance activity is the controller that communicates with the service computer connected to the system.

The components (e.g., circuits) used in the vHIM systems may be adaptively selected and/or configured to optimize performance. For example, in an example implementation, the circuits that employ through-hole components instead of surface mount components may be selected and/or used for the brake control/interface. This may be done, for example, to make it easier to achieve circuit spacing that matches particular criteria—e.g., sufficient circuit spacing to meet the AREMA C&S 17.3.3 spacing requirements for "Adjacent Printed Circuit Board Traces". The selection of through-hole based circuits may also be done to simplify the verification process with this circuitry when each credible failure mode identified in the brake control interface is introduced and tested. In another example, where a resistance value decrease (fault condition) may compromise system safety, MIL Type RN60 carbon film resistors (e.g., manufactured to MIL-R-55182) may be used are used. In this regard, per AREMA 17.3.3.1.c.3a, the resistors are accepted within the industry as not having a credible resistance decrease failure mode.

As noted above, vHIM based systems may be configured to comply with particular safety requirements and/or apply particular safety concepts, such as IEEE-1483 and AREMA safety concepts (e.g., Class I intrinsic fail-safe design, checked redundancy, diversity and self-checking, etc.). To that end, the MCM processors 360 and 370 may be arranged in a "checked redundancy" configuration, and may interact with the vHIM board 310 in the manner described above.

The vHIM based architecture 300 may also be configured to support and/or apply relay output safety concepts. For example, the final output stage of the vHIM may use relay contacts to interface with the P-wire and B-wire current loops using a class 1 intrinsic fail-safe design safety concept. In this regard, the relays used for the braking interface may be constructed using force guided contacts, comply with particular forcible contact standard (e.g. the EN50205 standard). However, it should be readily understood that the disclosure is not limited to such approach, and that other approaches may be utilized—e.g., where a certified "vital" (fail-safe) relay is used, which may be external to the circuit board to provide this switching function.

Thus, if the normally open NO contact welds closed, the normally closed NC contact will not close even when the relay coil is de-energized; and will maintain a gap of at least 0.5 mm. Similarly, if the NC contact welds closed, the NO contact will remain open even when the relay coil is energized, and will maintain a gap of at least 0.5 mm. This force guided relay construction ensures that a contact welding fault can reliably be detected. A monitored relay contact will provide an accurate representation of the position of the actual circuit-connected contact.

Further, the vHIM based architecture 300 may also be configured to support and/or apply braking relay driver safety concepts. For example, the vHIM based architecture 300 may be configured to implement and apply the "Diversity and Self-Checking" concept to assure proper operation of the control signals. The "diversity" portion of the safety concept is handled in hardware: two signals from each MCM drive the MCM's respective relay. In this regard, the MCM_CTL1 signal controls the "high-side" relay driver, while the MCM_CTL2 signal controls the "low-side" relay driver. Both drivers must be enabled in order to close the relay contacts, allowing normal train operation. The truth table for the relay control signal is illustrated below:

|  |  | MCM_CTL1 | |
|---|---|---|---|
|  |  | 0 | 1 |
| MCM_CTL2 | 0 | Brake | Brake |
|  | 1 | Brake | Run |

The "self-checking" portion of the safety concept is achieved by using a pair of identical, redundant processors (vHIM processors ("vHIMp") that operate in a "checked redundancy" fashion. In this regard, the vHIMp is effectively an extension of the MCM processor. This architecture allows monitoring multiple signals without requiring that all of the signals be routed over the backplane to the respective MCMs. The vHIM processors ("vHIMp") execute identical monitoring software, with each vHIMp communicating monitored vital parameters to its respective MCM for comparison with the results from the other MCM/vHIMp processor pair. The MCM/vHIMp communication may be performed, for example, over an asynchronous serial bus. The vHIM processors ("vHIMp") may also be adaptively configured to support or execute software corresponding to other safety features or functions. For example, in the case of a checked redundancy safety, the software might be identical or similar; or in other safety concepts, such as diversity and self-checking, it may be different.

There is one independent serial interface for each MCM/vHIMp pair. The vHIMp independently monitors the braking relay drive circuits driven by each MCM. A fault in either MCM's relay driver circuit is independently communicated to the respective MCM by its vHIMp. In addition, each vHIMp independently monitors the output contact position of each vehicle interface relay. A set of contacts isolated from the brake current loop is provided to support this monitoring function.

In some instances, the vHIM based architecture 300 may be configured for supporting relay control monitoring. In this regard, the position of each relay contact may be monitored in the vHIMp by sensing the state of an additional pole of the relay switch. The pole may be isolated from the actual braking circuit. Each vHIMp also monitors the relay coil drive circuitry, allowing both MCMs to determine if the braking circuit is working properly, and, if necessary, fail safe.

In an example implementation, the following signals for each braking relay drive circuit may be monitored by each vHIMp: 4 xMCM_CTLy signals (the braking relay command signals from each MCM); 2 KxHI_MON signals (the high-side relay coil driver signals controlled by the relay command signals); two Kx-LO_MON signals (the low-side relay coil driver signals controlled by the relay command signals; two Kx-NC_MON signals (the relay sensing signals from the normally closed relay contacts); and two Kx-NO_MON signals (the relay sensing signals from the normally open relay contacts).

In some instances, the vHIM based architecture 300 may be configured for supporting bypass switch monitoring. For example, additional isolated poles of the bypass switch may be monitored by the vHIM processors. This monitoring function allows the central control system to detect and log actuation of bypass switches, even when the system is powered down. Such monitoring and logging may be advantageous for tracking actions of train operators that may pose safety risks. In an example scenario, the operator may flipping off the circuit breaker, turning off the train control system, which will cause the brakes to engage. The operator may do this to temporarily perform an unauthorized or unsafe action. If operator turns off the breaker, the relays open and the brake is held on. The operator could then flip the bypass switch and do the improper action. Then the operator may then disable the bypass switch and power the train control system back on, with the improper action untracked. Thus, to ensure that such improper actions are tracked and documented, the system may be configured (e.g., using backup components) to continue monitoring the override/bypass switch even when power is off, for a finite period of time, such that all bypass activities may be logged, even while the train control system is not powered.

In some instances, the vHIM based architecture 300 may be configured for supporting self-testing. In this regard, different self-testing modes may be supported. For example, two levels of self-testing may be supported in an example central control system: "comprehensive" test and "ongoing self-test". In this regard, the comprehensive self-test may be performed, such as at start of each day or at a "cold-start" of the system, to ensure that the MCM/vHIM control and monitoring circuitry are all properly functioning. The comprehensive test may include opening each brake interface relay and confirming that the relay output matches the commanded input. The comprehensive test may also include verifying all intermediate states and combinations of logic operate correctly.

Once the comprehensive test is passed, periodic self-tests may be initiated at a sufficient frequency to ensure system integrity. In this regard, the interval will be in seconds, or even a fraction of a second. This self-testing may verify all control and monitoring circuits for the brake interface are functioning normally up to and including the relay coil. The relay contacts must not be switched during such ongoing self-test, however, as this would cause the application of the service brake at every test cycle. Thus, the self-test is configured to account for that. For example, the braking relay driver circuits may be tested by switching each control signal individually for a brief interval, slow enough to allow reliable detection of the proper operation of the driver circuit, but fast enough that the electro-mechanical relay will not switch the contact state. The self-test is initiated by the MCMs, and is coordinated with both of the vHIM processors, such that a test cycle will not be reported as a fault. For example, during testing, one and only one relay control signal will be switched. During normal operation, a change in state of one relay control signal without a change in the other is a fault condition. During self-test, only one of the signal pairs will be exercised in order to allow a determination that all elements of the relay driver and monitoring circuitry are operational.

In some instances, results for both the comprehensive self-test test and the ongoing self-tests may be monitored by both MCMs, such that a fault detected in either MCM may trigger a service brake application.

In an example use scenario corresponding to operation of the system/architecture during normal operation mode, a MCM (xMCM, where x=1 or 2) manipulates both relay control lines (xMCM_CTL1 and xMCM_CTL2) simultaneously—that is, for relay Kx (e.g., K1 340 in FIG. 3) is to be turned on, both xMCM_CTL lines need to be driven to a logic "true". The critical circuit lines (shown as "to vehicle B-loop" and "to vehicle P-loop" in FIG. 3) are wired in series with N.O. contacts of both HIM channels, resulting in the B-loop and P-loop being closed (thus, vehicle motion being permitted) only when both output relays are energized. Any failure which leads to loss of drive of one or both relays (e.g., power supply failure, relay driver or relay coil failure, etc.) would lead to opening of the critical loops.

Position of the relay contacts may be monitored by HIM CPU 320, and checked against pre-set conditions (e.g., against the voltage measured across the respective relay's coil). The monitoring may be configured based on the relays, and parameters and/or characteristics associated therewith. For example, in instances where the relays used in the HIM are of safety type (with mechanically linked contacts), monitoring of just one contact group may guarantee that all other groups are in similar mechanical position. The xMCM communicates the current state of its xMCM_CTL outputs to the respective HIM CPU 320 via the serial link, thus providing the latter with capability to cross-check the status of the xMCM_CTL lines as observed at its end, thus enabling discovering any discrepancies.

The relay driver (Q1/Q2 in FIG. 3, which are shown as N-channel JFETs but may comprise any suitable semiconductor switches) energizes the coil of the relay only when both xMCM_CTL lines are logic "true". Voltages at each end of the relay coil may be monitored, by the HIM CPU 320, and compared against the current state of the xMCM_CTL signals, to verify integrity of the relay driver elements and the relay coil. For redundancy, where multiple HIM CPUs are used, same inputs are provided to the other HIM CPU(s), each of which may then perform similar diagnostic operations. Any discrepancies discovered by either HIM CPU are reported back to the respective MCM(s) via the serial links. For example, 30K pulldown resistors to GND on each monitoring path may be used, to ensure that the signals go low (to a low logic state) when opened up (open-circuited).

In an example use scenario corresponding to operation of the system/architecture during diagnostic testing, the integrity of the relay drivers and relay coils during normal operation may be tested—e.g., performed periodically by each MCM and respective HIM channel, working coopera-tively. The testing sequence may differ—e.g., based on the particular implementation and/or state of the system. For example, in instances where it is determined that vehicle motion is not allowed and the HIM relays are de-energized (e.g., by driving the xMCM_CTL signals to logic "low"), the testing sequence may include:

a) xMCM notifies the HIM CPU via the serial link that its test sequence is starting. Also, the opposite HIM channel is notified of the same, using the opposite MCM as communication bridge.

b) Both HIMs verify that xMCM_CTL lines are "false" at their end, and there's no voltage on either end of the relay coil (Kx-HI_MON and Kx-LO_MON inputs), and the relay contacts are in the "off" position (Kx-NC_MON is "false", Kx-NO_MON is "true"). Test results are reported back to the xMCM.

c) The xMCM commands both HIM CPUs to move to next step and drives xMCM_CTL1 line to logic "true". The HIM CPUs verify that the xMCM_CTL1 line changed state to "true" and check voltages across the relay coil (Kx-HI_MON and Kx-LO_MON inputs). If both of those tested "true", both the upper relay driver (Q1) and the coil of the relay are OK. If both tested "false", the upper relay driver (Q1) has probably failed "open". If Kx-HI_MON is found to be "true" while Kx-LO_MON is "false", the relay coil has failed "open". Results of this test step are reported back to the xMCM via the serial link.

d) If the result of the previous step was "OK", the xMCM commands both HIM CPUs to move on to the next step and briefly (for less than 1 ms), such as by driving the xMCM_CTL2 line to logic "true" then returning it to "false". Such a short pulse will not change the state of the relay under test due to mechanical inertia, but will be sufficient to allow for the HIM CPUs to monitor the change of state of the xMCM_CTL2 line and confirm proper operation of the bottom relay driver (Q2) while both relay control lines are "true". If Kx-LO_MON is observed to become "false" for the duration of the xMCM_CTL2 being "on", result of this test step is OK. In some instances, current sensing of the current through the relay coil may be monitored, to confirm that the proper level of current is actually flowing in the relay coil. This may allow more thorough monitoring and diagnostics.

In instances where it is determined that the vehicle motion is allowed—that is, both HIM relays are energized, the test sequence may include:

a) xMCM commands both HIMs (using the opposite MCM as bridge to access the opposite HIM channel) to begin test sequence.

b) Both HIM CPUs verify that xMCM_CTL1 and xMCM_CTL2 lines are "true", Kx-HI_MON is "true", Kx-LO_MON is "false", Kx-NC_MON is "true" and Kx-NO_MON is "false".

c) The xMCM momentarily (for less than 1 ms) drives the xMCM_CTL2 output to "off". The HIM CPUs should observe the Kx-LO_MON level to become "true" for the duration of the test sequence.

d) The xMCM momentarily (for less than 1 ms) drives the xMCM_CTL1 output to "off". The HIM CPUs should observe the Kx-HI_MON level to become "false" for the duration of the test sequence.

In an example use scenario corresponding to operation of the system/architecture during bypass/override switch monitoring, at power-off (e.g., where the system's indication of good power becomes false, such as backplane PWR_GOOD signal in system 300 becoming low, indicating an imminent loss of power to the processor), an indication to interrupt inputs of the vHIM CPUs (e.g., nPWR_INT input to the HIM CPUs) may initiate transition to power-down logging operation. In this condition, the vHIM CPU is able to save event logging data which has been temporarily stored in volatile memory by moving the data into non-volatile memory even if the power that normally operates the circuitry has already dropped out of proper operating levels. This short-term power source may be derived from "super capacitors", and provides power only the circuitry necessary to allow the CPUs to perform the non-volatile log file storage transfer. This log file transfer power supply persists only as long as the respective super capacitor(s) providing the operating energy sustain sufficient charge.

In addition, the indication (e.g., the nPWR_INT signal) is used to disable the power input buffers and to disconnect the super capacitors from the vHIM power source voltage regulator outputs to prevent power backflow. Otherwise, the other circuitry in the system would also consume power from the non-volatile memory transfer backup power, resulting in premature discharge of the super capacitors and potentially insufficient time to transfer data to non-volatile memory. For some period after power-down, the vHIM CPUs remain powered in a low-power-consumption mode and continuously monitor the state of the override switch (S1) 350. Any change in state off override switch S1 will be logged into the non-volatile memory, such as electrically erasable programmable read-only memory (EEPROM). Logging entries into non-volatile memory are provided with timestamps from the CPU's internal real-time clocks, allowing short-term timekeeping after power-down for a finite period of time.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, various embodiments in accordance with the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

Various embodiments in accordance with the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A train-mounted system for controlling braking operations of a train, the system comprising:
   one or more circuits configured to:
      interface with a braking subsystem of the train;
      interface with a propulsion subsystem of the train;
      enable automated and/or remote control of the braking subsystem of the train and the propulsion subsystem of the train, wherein:
         the controlling is based on at least one control input received from a central train control system;
         the controlling comprises activating or deactivating the braking subsystem;
         activating the braking subsystem comprises use of one or more brake activation modes; and
         at least one brake activation mode comprises concurrently controlling both of the braking subsystem of the train and the propulsion subsystem of the train; and
      perform a self-test of the train-mounted system, wherein:
         the self-test is performed subsequent to a comprehensive test of the system,
         the self-test is performed during operation of the train and in a non-intrusive manner such that the braking subsystem and the propulsion subsystem are not affected or adjusted,
         the one or more circuits are configured to trigger one or more control signals that adjust one or both of the braking subsystem and the propulsion subsystem, and
         the one or more circuits are configured to, when facilitating performing the self-test in non-intrusive manner:
            switch status of each control signal for a first time period, set to allow reliable detection of the status of the control signal, and
            switch the status of the control signal back before reaching a second time period when a change in the status of the control signal causes an adjustment to one or both of the braking subsystem and the propulsion subsystem.

2. The system of claim 1, wherein the interfacing with the braking subsystem of the train and/or the propulsion subsystem of the train comprises use of a corresponding brake current loop and a corresponding propulsion current loop.

3. The system of claim 2, wherein the one or more circuits are configured to control the braking subsystem of the train and the propulsion subsystem by opening or closing one or both of the brake current loop and the propulsion current loop.

4. The system of claim 3, wherein the one or more circuits are configured to open both of the brake current loop and the propulsion current loop when initiating or executing at least one brake activation mode.

5. The system of claim 3, wherein the one or more circuits are configured to close both of the brake current loop and the propulsion current loop when enabling normal train operation.

6. The system of claim 1, wherein the one or more circuits are configured to monitor components and/or functions used in support of control of the braking subsystem of the train and the propulsion subsystem of the train.

7. The system of claim 6, wherein the one or more circuits are configured to continue monitoring at least one component and/or function used in support of control of the braking subsystem of the train and the propulsion subsystem of the train after powering off the system.

8. The system of claim 1, wherein the one or more circuits are configured to support redundant verification of the automated and/or remote control of one or both of the braking subsystem of the train and the propulsion subsystem of the train.

9. The system of claim 1, wherein the one or more circuits are configured to enable bypassing the automated and/or remote control of the braking subsystem of the train and the propulsion subsystem of the train.

10. The system of claim 9, wherein the one or more circuits are configured to bypass control of the braking subsystem of the train and the propulsion subsystem of the train based on an input from a train operator.

11. The system of claim 10, wherein the one or more circuits comprise a bypass switch configured to bypass components of the system used to facilitate the automated and/or remote control of the braking subsystem of the train and the propulsion subsystem of the train.

12. The system of claim 9, wherein the one or more circuits are configured to override the bypassing the automated and/or remote control of the braking subsystem of the train and the propulsion subsystem of the train based on one or more preset conditions.

13. The system of claim 1, wherein the one or more circuits are configured to monitor the bypassing of the automated and/or remote control of the braking subsystem of the train and the propulsion subsystem of the train.

14. The system of claim 1, wherein the one or more circuits are configured to support self-testing of the system.

15. The system of claim 14, wherein the self-testing of the system comprises a comprehensive testing of all components and all functions of the system, the comprehensive testing being performed only when the train is not moving.

16. The system of claim 15, wherein the one or more circuits are configured to support periodic self-testing of the system, after successful completion of the comprehensive testing, the periodic self-testing comprising testing only some of the components and/or the functions of the system.

17. The system of claim 14, wherein the one or more circuits are configured to support performing at least one self-test of the system while the train is moving, the at least one self-test being configured to not interrupt or inhibit normal operation of the train, including operation of the braking subsystem of the train and the propulsion subsystem of the train.

18. The system of claim 1, wherein the one or more circuits are configured to re-apply the self-test multiple times.

19. The system of claim 18, wherein the one or more circuits are configured to re-apply the self-test periodically at pre-set frequency.

20. The system of claim 1, wherein the one or more circuits comprise one or more electro-mechanical relays configured to trigger or adjust status of the control signals based on relay state.

21. The system of claim 20, wherein the second time period correspond to time needed for each electro-mechanical relay to switch a corresponding contact.

* * * * *